April 1, 1952   J. P. HANSEN ET AL   2,591,151
VACUUM TYPE FOOD CONTAINER
Filed April 26, 1949
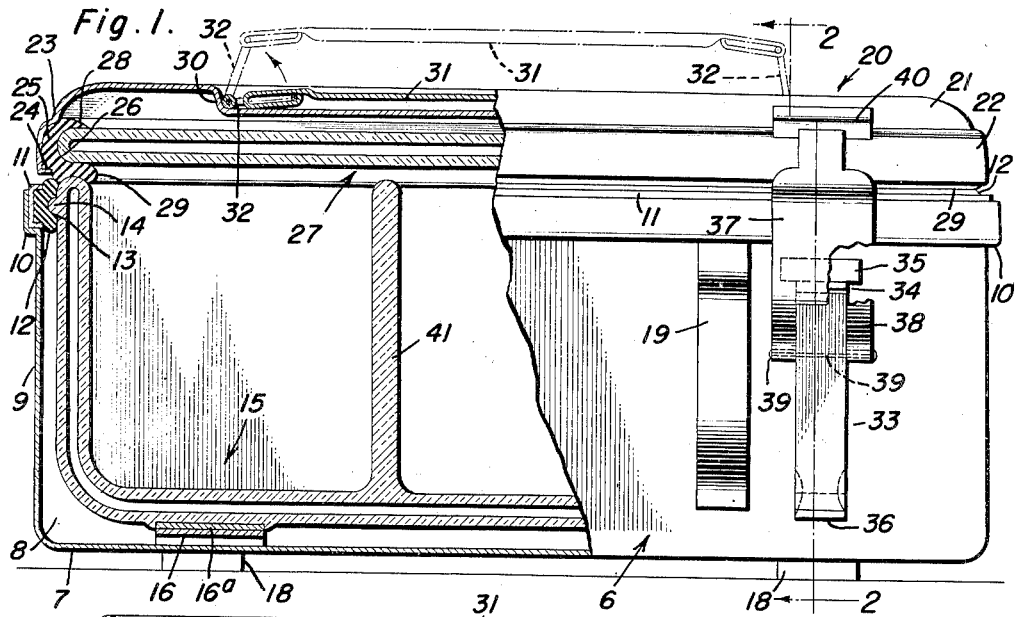
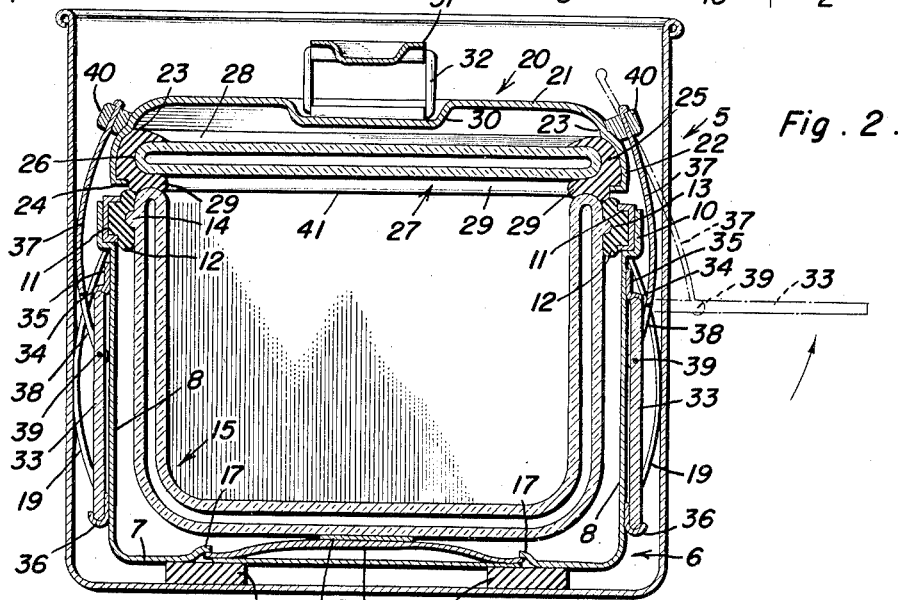
Inventors
James P. Hansen
Francis A. Wilmot
By Clarence A. O'Brien
and Harvey B. Jacobson
Attorneys

UNITED STATES PATENT OFFICE 2,591,151

VACUUM TYPE FOOD CONTAINER

James P. Hansen and Francis A. Wilmot,
Los Angeles, Calif.

Application April 26, 1949, Serial No. 89,746

4 Claims. (Cl. 206—4)

The present invention relates to certain new and useful improvements in vacuum-type food containers which are adapted to be inserted and carried in so-called conventional lunch kits and has reference in particular to a style of container which is expressly, but not necessarily, adapted to receive and preserve non-liquid food, such as meat and vegetables, either hot or cold, for palatable consumption.

Needless to say, and as the introductory statement of the invention sets forth, we are aware that food containers in this category and characterized by double-walled receptacles and closing lids therefor are not broadly new. It follows, therefore, that our primary objective is to provide a more efficient and aptly suitable container construction in which users will find their needs fully met, contained and conveniently available.

More specifically, novelty has to do, on the one hand, with a practical casing and cover assembly of stainless steel or equivalent protective material which provides an efficient and adaptable protective enclosure for the fragile double-walled glass container and lid units, whereby they satisfactorily withstand indiscreet handling by all sorts of users.

An equally important object is to provide gaskets, one for the lid in the cover and one between the container and its casing, said gaskets effectively coacting with each other and other parts to effect a reliable seal between the container and lid.

Still another object of the invention is to provide, in conjunction with the novel gasket arrangement, a plurality of closure fastening devices, these being of slack take-up form and serving to exert tension on the closure means and to simultaneously act on the gasket means so that latter functions to effect an acceptable seal between the stated container and its lid.

Then, too, novelty is predicated upon the encased vacuum container as a component unit of the overall structure and, in addition, on the closure unit by itself and in conjunction with the companion container unit.

In reducing to practice the construction herein shown and described we have evolved and produced, it is submitted, a construction which is possessed of refinements and structural and functional betterments which are superior to similar adaptations exhibited in analogous food containers in the same field of endeavor.

Other objects and advantages will become more readily apparent from the following description and the accompanying illustrative drawings.

In the drawings, wherein like numerals are employed to designate like parts throughout the views:

Figure 1 is a side view, partly in section and partly in elevation, showing a Thermos-type food container constructed in accordance with the principles of the present invention;

Figure 2 is an enlarged cross section taken on the vertical line 2—2 of Figure 1, looking in the direction of the arrows; and, Figure 3 is a fragmentary top plan view showing the handle means.

Referring now to the drawings by distinguishing reference numerals and accompanying lead lines, the numeral 5 designates what may be conveniently referred to as a lunch kit or box in which our improved food container is adapted to be yieldably fitted and held in place as illustrated.

The sheet metal box-like casing, generally rectangular in form, is denoted by the numeral 6 and embodies a flat bottom 7 and side and end walls 8 and 9 respectively. As best shown in Figure 2 the upper edge portions of said walls are formed with a substantially L-shaped rim 10 which slidably seats a channel member 11 carrying a gasket 12. The gasket is of the cross-sectional shape shown and is centrally provided on its inner surfaces with an endless groove 13 and this groove serves to receive a correspondingly shaped rib or bead 14 on the upper edges of the vertical walls of the double-walled glass food container 15. This food container is open at its top and of a depth slightly less than the depth of the casing. Thus, we have a vacuum-type container 15 fitting telescopically into a surrounding metal jacket or casing with a reinforced gasket interposed between the coacting walls and with a bead 14 fitting into a groove in the gasket. This slide-fit arrangement allows slight vertical shifting of the container 15 in relation to the casing 6. On the interior of the bottom 7 and at longitudinally spaced points we provide transversely bowed cushioning springs 16 which are detachably anchored at opposite ends in lugs 17 struck up from the bottom 7. On its exterior the bottom 7 is provided with suitably attached cushioning blocks 18 which rest removably on the bottom of the kit 5. The exterior sides of the casing 6 are also provided with outwardly bowed flat springs 19, two to a side, which are in yieldable contact with the kit and which serve to aptly maintain the entire container effectively and against accidental slippage in said kits, in an obvious manner.

The closure unit or means is denoted, generally, by the numeral 20 and comprises a stainless steel cover 21 having a depending marginal flange defining a rim 22. An indentation is provided at 23 to function as a stop shoulder and an inturned ledge flange 24 is provided to define an endless channel to seat the correspondingly shouldered portion of the closure gasket 25. The gasket 25 has a channel 26 fashioned therein to seal and seat the marginal edge portions of the flat double-walled vacuum lid 27. The gasket is held securely between the shoulder 23 and flange 24 and the upper wall 28 of the channel 26 overhangs the top wall of the lid 27 as shown in Figure 2. The lower portion of the gasket is fashioned into what we call a lip seal 29 and this in cross-section conforms in shape to the rounded upper edge portion of the container 15. The cover has a suitable shallow depression or well 30 to accommodate a receding handle 31. The handle may be of any suitable type and is preferably constructed as shown and is anchored by links 32 hinged at opposite ends of said well.

The cover retaining, gasket compressing, sealing and fastening devices of which we provide four (two on each side) are all the same in construction and the description of one will suffice for all. The latch lever is denoted by the numeral 33 and one end is adapted to fulcrum against an abutment 34 forming part of a bracket 35 which is fastened to the side wall 8. In order to hold the lever in closed position we provide a hooked keeper bracket 36 also fastened in place on wall 8, as shown. The numeral 37 designates a link of flexible type having a bifurcated lower end with the furcations 38 hinged at 39 to the intermediate portion of the lever 33. The upper headed end of the link is slidable through an anchoring member 40 mounted on the cover. The link 37 and lever 33 take the position shown in dotted lines in Figure 2 when released and take the positions shown in full lines when the lever is fastened down to hold the cover securely and to compress the gasket 25 and to effect a tight seal between the lid 27 and the container 15.

If desired, the container may be divided into separate compartments. In the showing made a single partition 41 illustrates the point to be made here.

In addition to the above, and if desired, a small pad, 16a, preferably of asbestos material may be fixed on the crown portion of the cushioning spring 16, in each instance and thus interposed between said spring and the double-walled bottom of container 15.

Briefly, it will be understood that a double-walled vacuum container is covered by an efficiently lidded cover and that the lever pulled links fasten down the lid and also bind the two gaskets 12 and 25 nicely and firmly together and what with the armoring properties afforded by the stainless steel jacketing means, a highly practical and desirable food container is, it is submitted, had.

It will be evident from the preceding description and drawings that one novel phase of the invention has to do with the longitudinally spaced transversely arranged bow-springs 16 having opposite ends detachably anchored at 17 on the bottom 7 of the casing, these serving as cushions for the double-walled vacuum container 15 and allowing the same to have telescoping and sliding fit in the casing. These springs serve to allow the container to recede into the casing and serve to shockproof the fragile container. Then, too, the vertical bow-springs 19 act in conjunction with the springs 16, said springs 19 being carried by the exterior sides of the casing walls for yieldable association with the corresponding walls of the kit 5.

Novelty is also predicated on the reinforced gasket means 12 which is anchored on and carried by the beaded portions of the container 15 wherein the channel member 11 constitutes a wear-resisting frame for the gasket means and has direct sliding contact with the offset rim 10 on the container.

It will be noted, in addition to the above, that the lip 29 of gasket means 12 not only rests on the upper edge of the walls of the container 15 but has direct compressible contact with the gasket means 12. Consequently, when the slack take-up and fastening devices are tightened to take the full line positions shown in Figure 2, the gaskets are firmly pressed together.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A Thermos-type food container for use in connection with a lunch kit comprising a casing embodying bottom, side, and end walls, a vacuum container fitted telescopically into said casing, yieldable cushioning springs interposed between the bottoms of said casing and container, said container being open at its top, gasket means attached to and surrounding the top portion of said container and having self-adjusting sliding contact with the corresponding portion of said casing, closure means for said open top, said closure means embodying a cover including a vacuum lid provided with a marginal gasket in direct contact with said first-named gasket and affording a yieldable seal between the closure means and container, and a plurality of closure tensioning, fastening and gasket compressing and binding devices, each device embodying a latch lever fulcrumed on said casing, a resilient link hingedly connected at one end with said latch lever, means on said closure means for slidably attaching the other end of said link to said closure means, and keeper means fixed on said casing for latching said lever in a closed position.

2. A Thermos-type food container comprising an open top box-like casing having bottom, side and end walls, a correspondingly shaped open top double-walled vacuum container fitted telescopically and slidably into said casing and having bottom, side and end walls, the upper edge portions of the side and end walls of said casing having an endless flange L-shaped in cross-section defining an adapter rim, an endless compressible gasket keyed to and surrounding the upper edge portions of the side and end walls of said container and shiftably mounted in said rim, cushioning springs anchored in the bottom of said casing, the bottom of said container resting upon said springs, and permitting relative movements between the container and casing to partly render said container substantially shockproof, closure means for the open top of said container comprising a cover, a vacuum lid disposed within the confines of said cover, gasket means interposed between said cover and lid and embodying a sealing lip resting on the upper edges of the side and end walls of said container and having compressible contact with said first-named gasket, and contractable fasteners carried by said cover, anchored on said casing and serving to press said gasket and gasket means firmly together.

3. The structure specified in claim 2, together with a plurality of vertically disposed bow-springs secured to the exterior surfaces of the side and end walls of said casing and adapted to bear against coacting walls of an enclosing kit.

4. A vacuum-type food container of the class described comprising an open top casing having bottom, side and end walls, a correspondingly shaped open top vacuum container fitted telescopically and slidably into said casing and having bottom, side and end walls, the upper edge portions of the side and end walls of said casing having an endless flange L-shaped in cross-section and defining an offset adapter rim, an endless compressible gasket keyed to and surrounding the upper edge portions of the side and end walls of said container, a channel-shaped gasket wear resisting and shape-sustaining member partially encasing said gasket and slidably and telescopically mounted in said rim, cushioning and shock-absorbing springs interposed between the bottom of said casing and the container, a readily applicable and removable cover for the open top of said container, said cover having a marginal rim with an endless inturned gasket anchoring flange, a second endless gasket located within the confines of said cover and resting partly on and held in place by said anchoring flange, the inner peripheral edge portion of said second named gasket having a channel-shaped recess, a vacuum lid situated within the confines of said cover and having its outer marginal edge portion fitted and sealed in said recess, the normal bottom side of said second named gasket having a sealing lip depending below the planes of said anchoring flange and bottom of said lid, said lip resting on the upper edge portion of the side and end walls of said container and, in addition, having direct compressible contact with a coacting edge portion of said first named gasket, and slack take-up and fastening devices mounted respectively on the cover and casing, said devices, when closed, serving to compress the respective gaskets into binding contact and serving to compress the aforementioned springs to cause the container to recede into said casing and to firmly seat the first named gasket in said rim.

JAMES P. HANSEN.
FRANCIS A. WILMOT.

REFERENCES CITED

The following references are of record in the file of this patent:

UNITED STATES PATENTS

| Number | Name | Date |
|---|---|---|
| 1,831,663 | Hill | Nov. 10, 1931 |
| 2,000,780 | Miller | May 7, 1935 |
| 2,026,967 | Devine | Jan. 7, 1936 |